United States Patent [19]

Wisotsky

[11] 4,059,351
[45] Nov. 22, 1977

[54] HAND-HELD FILM PROJECTORS

[76] Inventor: Harry A. Wisotsky, 1284 Ocean Parkway, Brooklyn, N.Y. 11230

[21] Appl. No.: 732,721

[22] Filed: Oct. 15, 1976

[51] Int. Cl.² .............................................. G03B 21/00
[52] U.S. Cl. ........................................ 353/43; 353/71;
353/95; 40/64 A; 40/130 B
[58] Field of Search ...................... 353/1, 43, 100, 101,
353/35, 71, 95, 122, 7, 9; 350/255, 241; 40/63
A, 64 A, 106.1, 130 B

[56] References Cited

U.S. PATENT DOCUMENTS

| | | | |
|---|---|---|---|
| 1,992,776 | 2/1935 | Schindler | 353/43 |
| 2,122,649 | 7/1938 | Kahn | 40/63 A |
| 2,206,865 | 7/1940 | David et al. | 40/106.1 |
| 2,294,622 | 9/1942 | Langberg et al. | 353/43 |
| 2,616,332 | 11/1952 | Sorkin | 353/43 |
| 2,883,907 | 4/1959 | Silent | 40/64 A |

Primary Examiner—Richard E. Aegerter
Assistant Examiner—John W. Shepperd
Attorney, Agent, or Firm—Steinberg & Blake

[57] ABSTRACT

A hand-held projector for projecting from a transparency on a film strip and image onto any desired surface. The film strip with a series of transparencies is guided in a casing which has a front peripheral wall portion carrying an objective behind which is situated a light source with the film being guided between the light source and objective. A manually operable member is accessible for feeding the film strip frame by frame along the guide in the casing so that successive transparencies will be projected. Batteries from which energy is derived for the light source are situated in the casing on opposite sides of the light source so that a balanced compact arrangement is achieved.

5 Claims, 14 Drawing Figures

U.S. Patent  Nov. 22, 1977  Sheet 1 of 3  4,059,351
FIG.1
FIG.2
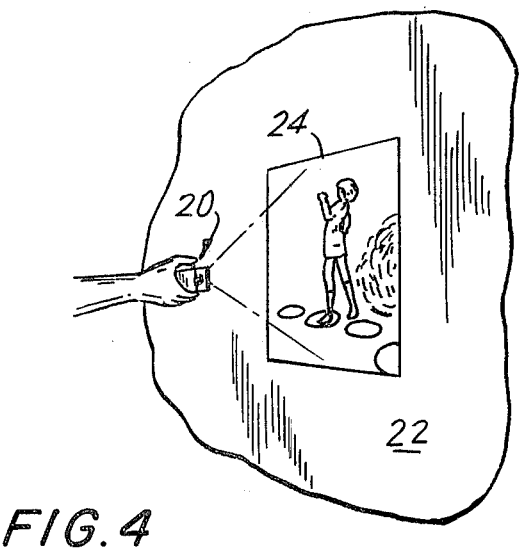
FIG.3
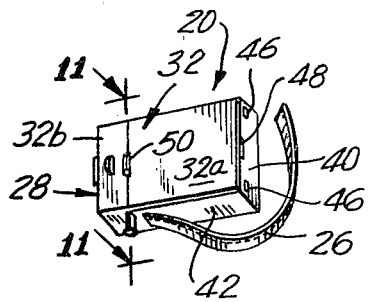
FIG.4
FIG.5
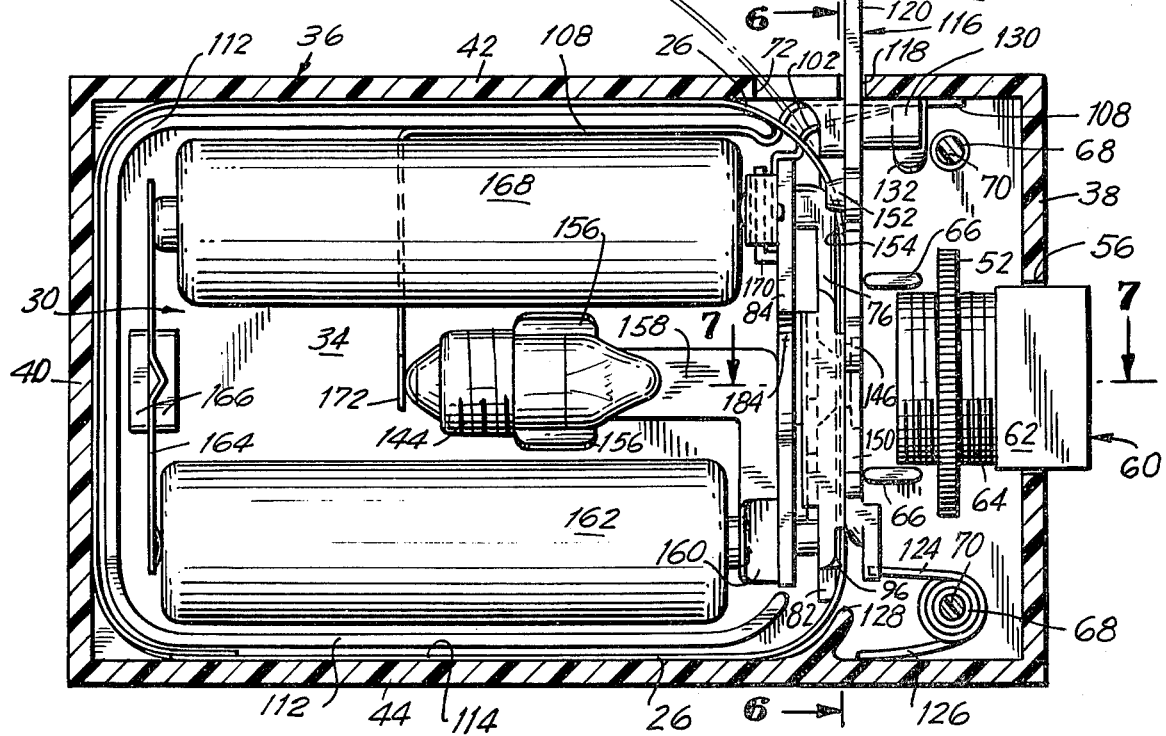

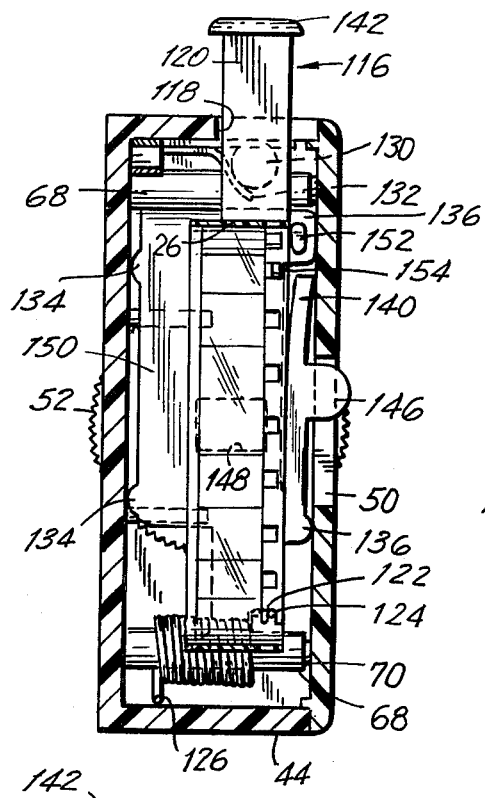
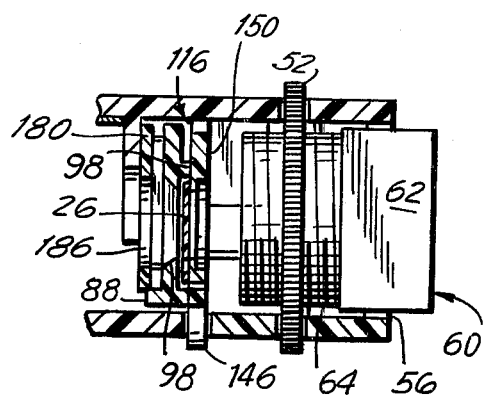
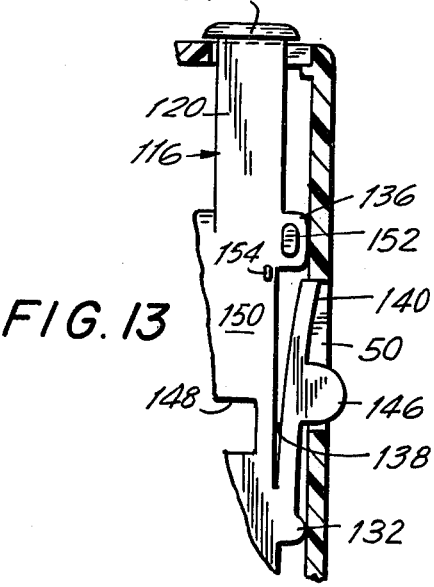
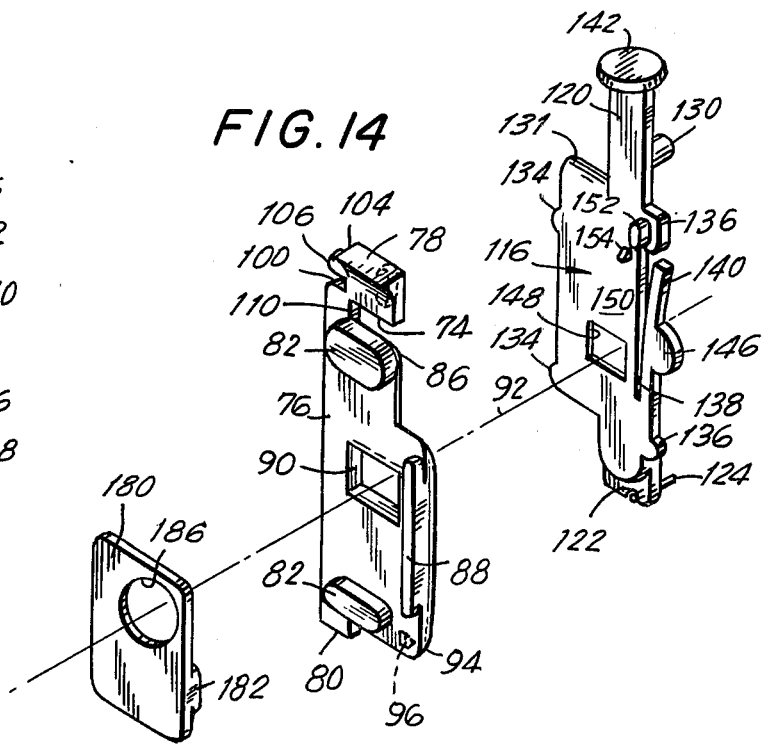

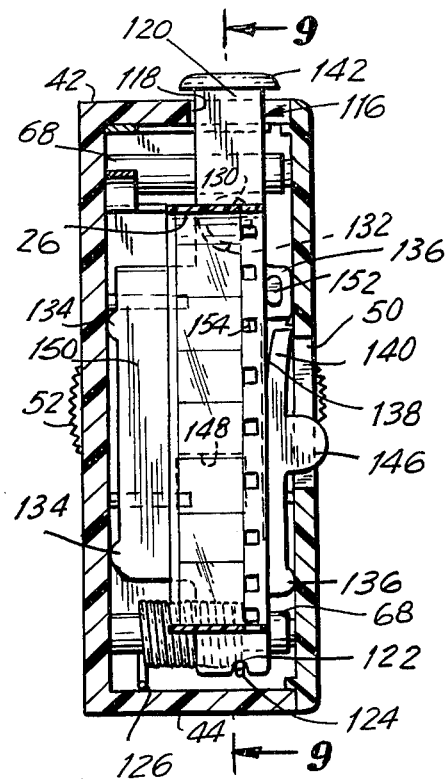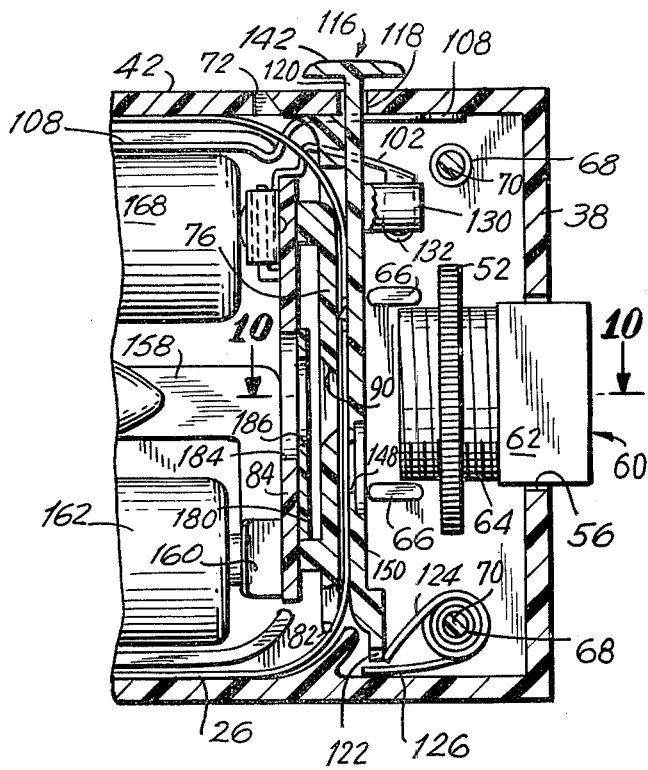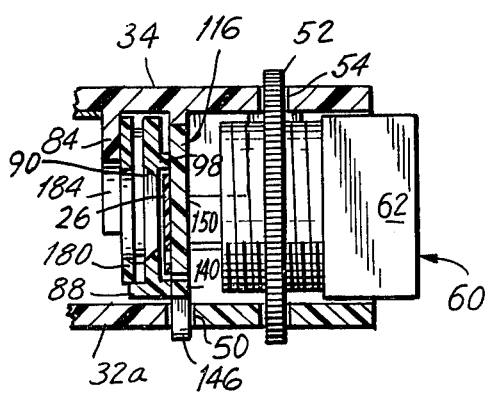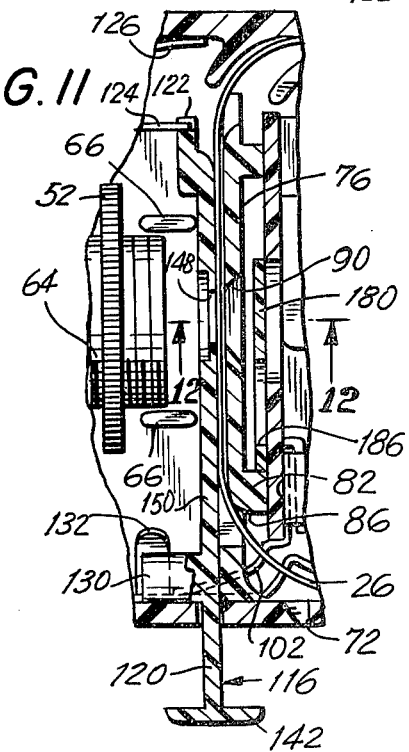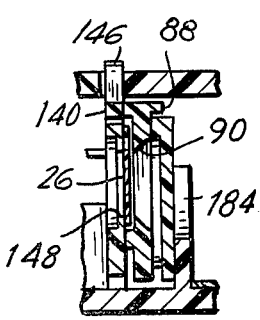

HAND-HELD FILM PROJECTORS

BACKGROUND OF THE INVENTION

The present invention relates to projectors for projecting onto a desired surface an image of a transparency.

In particular, the present invention relates to projectors capable of being hand-held while carrying an elongated strip of transparencies which can be advanced so that the transparencies can be projected one after the other.

Hand-held projectors of the above type are well known. Many of them have a configuration of pistols, being provided with a pistol- type of grip and with a simulated trigger which is manipulated in order to advance the film strip so as to position the transparencies one after the other along the optical axis to have their images projected.

Conventional projectors of the above general type suffer from a series of drawbacks. In the first place, they are relatively complex and expensive. In the second place, they are relatively large and unwieldy to handle. In addition, particular problems are encountered with respect to arranging the batteries in such structures and changing the batteries. Also, problems are encountered in connection with guiding a film strip in devices of the above type.

Moreover, in a situation where there is no available surface onto which an image can be projected, or in a situation where an individual wishes to view the transparencies without necessarily projecting images thereof onto a surface, it is not possible to make use of devices of the above type. Instead, special viewers are required.

SUMMARY OF THE INVENTION

It is accordingly a primary object of the present invention to provide a hand-held projector of the above general type which will avoid the above drawbacks.

In particular, it is an object of the present invention to provide a projector of the above type which is exceedingly simple and compact, while at the same time having a balanced construction and capable of being very easily held in the hand of an operator for projecting images onto a desired surface.

In particular, it is an object of the present invention to provide a construction according to which it is possible to arrange batteries with respect to a light source in such a way that an exceedingly compact and at the same time balanced symmetrical construction is achieved.

Furthermore it is an object of the present invention to provide a construction of the above type with the capability of adjusting an objective so as to be able to focus an image properly.

Furthermore it is an object of the present invention to provide a construction of the above type which can very conveniently be converted from use as a projector to use as a viewer.

In addition, it is an object of the present invention to provide a construction of this type which is not only simple and compact but which also is made of inexpensive components which will operate reliably over a long period of time.

According to the invention the hand-held projector includes a casing means having opposed side walls and a peripheral wall interconnecting the opposed side walls to define therewith the hollow interior of the casing means, this peripheral wall having opposed front and rear portions as well as opposed longitudinal portions extending between the front and rear portions. Midway between the front portion of the peripheral wall is situated an objective means, the optical axis of which extends parallel to and substantially midway between the longitudinal portions of the peripheral wall, and a light-source means is situated in the interior of the casing means behind the objective means with a pair of batteries being situated in the casing means on opposite sides of the light-source means to provide the above balanced, symmetrical arrangement. Between the light-source means and the objective means is a film-guide wall which extends perpendicularly between the side walls of the casing means and which cooperates with a film-guide means extending at the rear of the film-guide wall along the longitudinal walls and rear wall of the casing means in the interior thereof. One of the longitudinal walls is formed with a slot through which the film may be introduced for movement along the film-guide wall and along the film-guide means in the casing means, this film-guide wall having a front surface along which the film is guided. Of course the film-guide wall is formed with an opening through which the optical axis extends so that the light can travel through the film-guide wall to project an image on a transparency. Between the film-guide wall and the objective means is a manually operable film-advancing means which extends along the film-guide wall to operate therewith for guiding film, this film-advancing means extending through an opening in one of the longitudinal portions of the peripheral wall and being acted upon by a spring means in the casing means to assume an outer position while being held in opposition to the spring means at an inner position by the cooperation of a springy pawl projecting from the manually operable film-advancing means and engaging an edge of an opening in a side wall of the casing means. This film-advancing means and engaging an edge of an opening in a side wall of the casing means. This film-advancing means is itself formed with an opening which is aligned with the opening of the film-guide wall only when the film-advancing means is displaced to its outer position by the spring means. An electrical circuit structure is situated in the casing means for electrically connecting the batteries with the light source means, and this surface structure includes a switch capable of assuming a closed position when the film-advancing means is in its outer position while being opened by the film-advancing means, by way of a projection of the latter, when the film-advancing means is moved further into the casing means in opposition to the spring means. The film-advancing means has a film-advancing tooth capable of extending into a perforation of a film strip for advancing the latter when the film-advancing means is moved by the operator from the outer to the inner position, while the film-guide means has a tooth also engaging a perforation of a film strip to prevent the latter from moving with the film-advancing means when the latter returns to its outer position.

BRIEF DESCRIPTION OF DRAWINGS

The invention is illustrated by way of example in the accompanying drawings which form part of this application and in which:

FIG. 1 is a schematic illustration of the structure of the invention utilized as a viewer;

FIG. 2 illustrates how the structure of the invention is used as a projector;

FIG. 3 is a schematic perspective illustration showing the orientation of the device of the invention when it is used as a viewer and during film-loading;

FIG. 4 illustrates in a perspective view the orientation of the device of the invention when used as a projector with FIG. 4 also showing the structure during film-loading;

FIG. 5 is a longitudinal sectional elevation, taken along line 5—5 of FIG. 4 in the direction of the arrows and showing details of the structure of the invention at a scale which is enlarged as compared to FIGS. 1–4;

FIG. 6 is a transverse sectional elevation taken along line 6—6 of FIG. 5 in the direction of the arrows and showing the details of a film-advancing means;

FIG. 7 is a fragmentary sectional plan view taken along line 7—7 of FIG. 5 in the direction of the arrows and in a plane which contains the optical axis of the objective means which is shown in FIGS. 5 and 7;

FIG. 8 is a view of the structure of FIG. 6 as shown in the position where the film-advancing means has been moved by the operator to an inner position thereof, this inner position being distinguished from the outer position as shown in FIG. 6;

FIG. 9 is a fragmentary longitudinal section at the front region of the projector of the invention; taken along line 9—9 of FIG. 8 in the direction of the arrows and showing the position which the parts take at the inner position of the film-advancing means, this position of FIG. 9 being contrasted with that of FIG. 5 where the film-advancing means is shown in its outer position;

FIG. 10 is a sectional view taken along line 10—10 of FIG. 9 in the direction of the arrows and showing further details of the structure when in the position of FIGS. 8 and 9, FIG. 10 being contrasted with FIG. 7 which shows the corresponding position of the parts when in the position of FIGS. 5 and 6;

FIG. 11 is a fragmentary sectional view taken along line 11—11 of FIG. 3 in the direction of the arrows and showing the structure when used as a viewer;

FIG. 12 is a sectional plan view taken along line 12—12 of FIG. 11 in the direction of the arrows and showing further details of the structure of FIG. 11;

FIG. 13 shows in a fragmentary partly sectional elevation the film-advancing means releasably held at its inner position by a springy pawl of the film-advancing means; and FIG. 14 is an exploded perspective illustration showing, from the lower left toward the upper right of FIG. 14, the details of a masking means, a film-guiding wall, and the film-advancing means of the structure of the invention.

DESCRIPTION OF PREFERRED EMBODIMENTS

Referring now to FIG. 1, the hand-held projector 20 of the invention is shown in FIG. 1 in the manner in which it is optionally used by the operator as a viewer. FIG. 2 shows how the hand-held projector 20 of the invention is used for projecting onto any suitable surface 22 an image 24 derived from a transparency which forms one of a series of transparencies on a film strip 26 shown in FIG. 3 in the condition it has when loaded into the projector 20 when the latter is used as a viewer and shown in FIG. 4 being loaded into the projector 20 when the latter is in the attitude which it takes when used as a projector.

The projector 20 includes a casing means 28 which has a hollow interior 30 indicated in FIG. 5. The casing means 28 has a pair of opposed parallel flat side walls 32 and 34. These side walls 32 and 34 (FIG. 5) are interconnected by an endless peripheral wall 36 of the casing means 28. The endless peripheral wall 36 has a front portion 38 and an opposed rear portion 40 as well as a pair of opposed longitudinal portions 42 and 44 extending between the front and rear portions 38 and 40, with the longitudinal portion 42 being shown in an upper position in FIG. 5. The side wall 32 has a forward portion 32b which is permanently connected with the front wall portion 38 of the endless peripheral wall 36 and extends rearwardly therefrom along forward portions of the longitudinal peripheral wall portions 42 and 44. To the rear of this permanently fixed portion 32b is a removable side wall portion 32a which can be removed by the operator to give access to the interior 30 of the casing means 28. Thus, at its front edge the removable side wall portion 32a may have a pair of projections which can be received behind the rear edge of the fixed wall portion 32b, while at its rear edge the removable wall portion 32a has a pair of springy tongues which can be snapped by the operator into a pair of openings 46 formed in the rear wall portion 40, the latter being formed along one edge with a shallow notch 48 through which the operator can insert a coin or the like to release the wall 32a from the remainder of the casing means 28 when access to the interior 30 thereof is required.

In addition, the wall portions 32a and 32b are formed at their adjoining edges with aligned elongated notches which define a slot 50 passing through the side wall 32 for a purpose referred to below. Forwardly of the slot 50 the side wall portion 32b is formed with an additional slot through which the knurled periphery of a nut 52 extends, the portion of side wall 34 which is opposite the portion 32b of side wall 32b formed with a slot which receives an opposed peripheral portion of the knurled nut 52, so that the latter has opposed portions which extend through the slots which are accessible to the operator to enable the operator to turn the nut 52 manually. These opposed slots 54 through which the periphery of the knurled nut 52 freely extends are indicated in FIG. 10.

The front wall portion 38 of the endless peripheral wall 36 of the casing means 28 is formed midway between its opposed ends with a square opening 56 which receives the front square end of an objective means 60 which has rearwardly of its front square end 62 an externally threaded tubular portion 64 onto which the knurled nut 52 is threaded. The rear portion of the threaded part 64 of the objective means 60 is received between a pair of guide bosses 66 which are molded integrally with the wall 34 of the casing means 28 and which project from the wall 34 toward but terminate short of the front wall portion 32b of the wall 32. The entire casing means 28 is in the form of a single molded member with the exception of the wall 32, the portion 32b of which is permanently fixed with the remainder of the casing as by a suitable adhesive or the like while the wall portion 32a is removable. For the purpose of fixing the front wall portion 32b to the remainder of the casing means 28, the wall 34 thereof is integrally formed with the pair of tubes 68 (FIG. 5), while the wall 32b is integrally formed with a pair of pins 70 which are respectively received in the tubes 68 and which are respectively coated with a suitable adhesive before being introduced into the tubes 68, so that in this way a permanent connection is provided between the front wall portion 32b and the remainder of the casing means 28.

Of course, before the wall portion 32b is joined with the remainder of the casing means, the objective means 60 is placed in the position shown in FIG. 5 with the knurled nut 52 extending through the slot 54 in the wall 34, and then the wall portion 32b is joined to the remainder of the casing with the knurled nut 52 extending through the slot 54 of the wall portion 32b. Thus with this arrangement the operator can turn the nut 52 at the portions thereof which project beyond the opposed side walls of the casing means, and thus the objective means 60 can be moved to the right and left, as viewed in FIG. 5, along the optical axis of the objective means, for the purpose of focussing an image.

The longitudinal wall portion 42 of the endless peripheral wall 36 of the casing means 28 is formed just to the rear of the side wall portion 32b with a film-loading slot 72, this slot being open at its end which is nearest to the removable wall portion 32a, with the latter closing the slot 72 when the wall 32a is assembled with the remainder of the casing means 28. The film strip 26 is loaded by being advanced by the operator through the slot 72 into the interior 30 of the casing means 28. The position taken by the film strip 26 during loading thereof is indicated in phantom lines in FIG. 5. The front surface of the slot 72 is curved so as to guide the film to a transverse notch 74 formed in a film guide wall 76 which is shown most clearly in FIG. 14. The film guide wall 76 is of a generally rectangular configuration, having an end surface 78 which directly engages the inner surface of the longitudinal wall 42. The opposed end surface 80 of the wall 76 rests on a boss 82 formed integrally with and projecting through a short distance from the wall 34 of the casing means 28. This film guide wall 76 is integrally formed with a pair of rearwardly directed bosses 82 which bear against an interior transverse wall 84 formed integrally with and extending perpendicularly from the inner surface of the wall 34. At the lower forwardly directed edge of the film-receiving notch 74, the wall 76 is formed with a convexly surface 86 which participates in the guiding of the film from the slot 72 along the front surface of the film-guide wall 76 toward the opposed longitudinal wall 44. Distant from the wall 34, the film-guide wall 76 is formed with a longitudinal guide rib 88 for a purpose referred to below. Also, the film-guide wall 76 is formed with an aperture 90 through which the optical axis 92 of the objective means 60 extends in the manner indicated in FIG. 14, the optical axis 92 passing through the center of the opening 90. At its lower edge portion, which is situated beyond the part engaging the boss 82 the film-guide wall 76 also has a convexly curved surface 94 for guiding the film along the inner surface of the longitudinal wall 44 in the manner indicated in FIG. 5. This lower curved guide surface 94 has a tooth 96 which is integral with the wall 76 and which enters a perforation of the film strip, the shape and attitude of the tooth 96 being such that it permits the film to be advanced downwardly toward the wall 44 while preventing movement of the film in the opposite direction.

At its front surface along which the film is guided, the film-guide wall 76 is formed with a pair of longitudinal parallel ribs 98 between which the film is confined and guided, as shown in FIGS. 7 and 10. At its upper end region 78 the guide wall 76 is convexly curved to contribute to the guiding of the film through the notch 74. Adjacent this upper end 78, at its edge which engages the wall 34, the film-guide wall 76 is formed with a notch 100 through which a narrow portion of an electrically conductive metal strip 102 extends for a purpose referred to below. The end edge 104 of end 78 of wall 76 is spaced from the wall 34 to define therewith over the portion 106 of the wall 76 a space through which a second narrow portion of an electrically conductive strip 108 extends for a purpose referred to below. It will be noted that the inner end 110 of the notch 74 is situated nearer to the wall 32 than the notch 100 and the edge 104, so that the film moves across the conductive strips 102 and 108 without engaging the latter. In this connection it is to be noted that the optical axis 92 of the objective means 60 is situated slightly nearer to the wall 32 than the wall 34 and the objective 60 is itself situated directly in engagement with the front wall portion 32b while being spaced from the wall 34. The opening 56 has only three sides at the wall 38, with this opening being closed and having its fourth side formed by the front side wall portion 32b, so that when the parts are assembled the objective 60 is introduced into the casing perpendicularly to the plane of FIG. 5.

The inner wall 34 of the casing means 28 is integrally formed with a substantially C-shaped guide rib 112 which extends along and is spaced from the longitudinal walls 42 and 44 and also extends along and is spaced from the rear end wall 40, as indicated in FIG. 5, so as to define with the walls 40, 42, and 44 an elongated film-guide groove 114 through which the film strip can freely travel. This guide rib 112 extends from the wall 34 toward but terminates at a substantial distance from the wall 32. It will be seen that the lower right end of the rib 112 is suitably curved in FIG. 5 to receive the film from the lower end of the film-guide wall 76, while the upper right end of the guide rib 112, as viewed in FIG. 5, is also suitably curved for guiding the film back to the notch 74, so that a film strip of suitable length can be repeatedly guided along an endless path in the projector of the invention.

The film is manually advanced frame-by-frame in the projector by way of a manually operable film-advancing means 116 which is shown in FIG. 14 to the right of the film-guide wall 76. Forwardly of its opening 72 the longitudinal wall 74 is formed with a transverse slot 118 having an open end closed by the front side wall portion 32b when the latter is assembled with the projector. However, prior to assembly of the front side wall portion 32b with the remainder of the casing means 28, the film-advancing means 116 is introduced into the interior of the casing with the elongated narrow portion 120 extending through the slot 118 and being freely movable perpendicularly to the longitudinal wall portion 42 toward and away from the longitudinal wall portion 44. Thus, the manually operable film-advancing means 116 is movable between the outer position thereof shown in FIG. 5 and the inner position thereof shown in FIG. 9. At its inner end edge distant from the slot 118, the film-advancing means 116 is formed with a notch 122 receiving a free end of a wire spring 124 which is coiled about the lower tube 68, as viewed in FIG. 5, and which has a free end 126 engaging the inner surface of the longitudinal wall 44 in front of an upwardly directed guide rib portion 128 of the wall 44 which serves to receive and guide the film from the film-guide wall 76 into the groove 114. Thus, the spring 124 forms a spring means uring the film-advancing means 116 outwardly to its outer position shown in FIG. 5. This movement of the film-advancing means 116 from the inner position thereof shown in FIG. 9 to the outer position thereof shown in FIG. 5 is limited by a pin 130 which is integral with the film-advancing means 116 and which extends therefrom forwardly toward the front wall portion 38. It will be seen from FIG. 14 that the pin 130 is situated at a lower front portion of the stem 120 which extends freely through the slot 118, while below the pin 130 the film-advancing means 116 is formed with an upper edge region 132 extending from the stem 120 toward the wall 34 and defining with the latter and with the longitudinal wall 42, even when the pin 130 engages the wall 42, a space through which the conductor 102 can freely pass, as is apparent from FIG. 5.

The conductor 102 is made of a spring sheet metal which due to its own inherent resiliency tends to assume the position shown in FIG. 5. In this position the springy conductor 102 presses against and engages a front end region of the springy conductor 108 which at its front end region extends along and directly engages the inner surface of the longitudinal wall portion 42. As will be apparent from the description below, these front engaging portions of the conductors 102 and 108 form a switch, and this switch is closed when the parts are in a position shown in FIG. 5. At its front end the springy conductor 102 has a downwardly curved transverse portion 132 which extends beneath the pin 130, so that when the film-advancing means 116 is moved by the operator in opposition to the spring 124 to the position shown in FIG. 9, the pin 130 will engage portion 132 of conductor 120 and displace the latter to the position shown in FIG. 9, so as to open the switch formed by the front end regions of the portions 102 and 108. Thus, pin 130 acts not only to limit the movement of the film-advancing means but also as a switch-operating member for opening the switch 102, 108 when the film-advancing means 116 is displaced to the inner position thereof shown in FIG. 9.

At its edge which is adjacent the wall 34, the film-advancing means 116 has a pair of convexly curved projections 134 which slide along the inner surface of the wall 34. At its opposed side edge, the film-advancing means 116 has a pair of projections 136 which slide along the inner surface of the front side wall portion 32b. Between these projections 136 the film-advancing means 116 is formed with an elongated slit 138 forming on the side of the film-advancing means 116 which is next to the front wall portion 32b a springy tongue 140 which automatically snaps into the slot 50 when the film-advancing means 116 has been displaced to the inner position thereof shown in FIG. 9. For convenience in manipulation of the film-advancing means, the step 120 thereof carries at its outer end a transverse flat portion 142, formed integrally with the remainder of the film-advancing means and freely accessible to a finger of the operator. A comparison of FIGS. 6, 8, and 13 illustrates how the springy tongue 140 behaves during lowering of the film-advancing means from the upper or outer position shown in FIG. 5 to the inner or lower position thereof shown in FIG. 9. Thus, when the film-advancing means reaches the position shown in FIG. 9, the tongue 140 will snap to the position shown in FIG. 13 and engage an end of the slot 50 to releasably maintain the film-advancing means, in opposition to the spring 124, at the inner position shown in FIG. 9. It will be seen that the rear ends of the bosses 66, between which the objective means is guided, engage the front surface of the film-advancing means 116 to participate in the guiding thereof. This film-advancing means 116 will normally remain at its inner position shown in FIG. 13, with the switch 102, 108 open, so that a light source means 144 connected into an electrical circuit which is closed and opened by the switch means 102,108 will remain extinguished while the film-advancing means 116 is held in its inner position in the manner illustrated in FIG. 13. The springy tongue 140 has a projection 144 which extends freely through the slot 150 so as to be accessible to the operator. The operator need only push the projection 144 inwardly toward the interior of the casing means to displace the tongue 140 inwardly beyond the slot 50 so as to release the film-advancing means to the force of the spring means 124 which now will automatically move the film-advancing means 116 to its outer position, with the switch of the electrical circuit of the light-source means 144 automatically closing at this time in the manner described above.

The film-advancing means 116 is formed with an opening 148 passing therethrough, and this opening 148 is aligned with the opening 90 only when the film-advancing means 116 is in its outer position. Thus, at this time the optical axis 92 will also pass centrally through the opening 148. When the film-advancing means 116 is in its inner position shown in FIG. 9, the opening 148 is situated below the opening 90, as viewed in FIG. 9, so that not only is the switch 102,108 open, but in addition any passage of light through the opening 90 is blocked by the film-advancing means 116.

The rear surface 150 of the film-advancing means, this rear surface 150 being visible in FIG. 14, engages the forwardly directed ribs 98 of the film-guide wall 76 as shown in FIGS. 7 and 10, so that the film 26 is accurately guided at its edges between the ribs 98 and at its opposed surfaces between the film-guide wall 76 and the film-advancing means 116. Above the guide rib 98 which is nearest to the wall 32 the film-advancing means 116 has a rearwardly directed boss 152 which at its side edge directed toward the wall 34 serves also to guide the film in the manner shown most clearly in FIG. 5. Somewhat below the boss 152 and closer than the latter to the wall 34 the film-advancing means 116 is formed with an integral film-advancing tooth 154 which extends into a film perforation and moves the film toward the longitudinal wall 44 when the film-advancing means 116 is displaced by the operator in opposition to the spring means 124 from its outer to its inner opposition respectively shown in FIGS. 5 and 9. The shape of the tooth 152 is such that while it will engage an edge of a perforation and move the film downwardly along the wall 76, as viewed in FIG. 5, the configuration of the tooth 152 is such that it will ride along the film up to the next perforation thereof when the film-advancing means 116 is displaced upwardly by the spring means 124, as viewed in FIG. 5. Of course the film is held against upward movement with the film-advancing means by way of the stationary tooth 96 of the film-guide wall 76.

As has been indicated above, the conductive strip portions 102 and 108 form part of an electrical circuit in which the light-source means 144 is situated. This light-source means 144 is in the form of a lamp of conventional construction having an outer conductive sleeve or ferrule received and gripped between a pair of conductive springy fingers 156 which are integral with and project from a flat strip 158 which is secured in any suitable way against the inner surface of the wall 134 which of course is made of a plastic, non-conductive material, and of course the same is true of the instructure of the entire casing means and of all of the components referred to above except the electrically conductive portions 102 and 108. The conductive strip 158 which thus is in electrical contact with the outer conductive ferrule of the lamp 144 is of a substantially L-shaped configuration and has a portion projecting from its lower end, as viewed in FIG. 5, along the rear surface of the wall 84 of the casing means. This portion 160 forms a springy contact for engaging one end of a battery 162, the opposed end of which engages a conductor strip 164 mounted in the casing means between a pair of bosses 166 which are integral with the wall 34. The opposed end of the conductive strip 164 makes electrical contact with the end of a second battery 168 whose opposed end engages a free end of the conductive strip portion 102. This free end of the conductive strip portion 102 is of a substantially U-shaped configuration and receives a leg of a plastic L-shaped portion 170 integral with and projecting from the interior transverse casing wall 84. The conductive strip 108 has a relatively narrow portion seated in a suitable interior groove of the wall 44 and situated behind the battery 168, this conductive strip 108 terminating midway between the batteries 162 and 168 in a projecting portion 172 which projects from the wall 34 toward the wall 32 and which presses against the left end contact of the lamp 144 in the manner shown in FIG. 5. Thus it will be seen that the electrical circuit goes from the strip 108 through the lamp 144 and the strip 158 to the battery 162, continuing from the latter through the conductor 164 and the battery 168, and then terminating at the conductive strip 102. Thus when these strips 102 and 108 engage each other, the circuit through the lamp 144 will be completed while when the front end portions of the conductive strips 102 and 108 are spaced from each other, the circuit will be open.

It will be seen that through this arrangement of the components an exceedingly balanced, compact, and symmetrical arrangement is provided. By situating the lamp between the pair of batteries and both the lamp and the batteries in the space around which the film travels while situating the objective and the film-advancing means just in front of the film, a simple, balanced, symmetrical compact assembly is provided, with the entire structure being small enough to be held conveniently in the hand of the operator.

The film strip 26 may have transparent leading and trailing portions which can overlap each other. When it is situated in the projector, the operator need only advance the film-advancing means 116 from the outer to the inner position thereof to advance a frame into a position to be projected. Upon depressing the projection 146, the film-advancing means 116 will snap to its outer position under the force of the spring 124, and the switch 102, 108 will automatically close, so that the lamp 144 becomes illuminated and an image of a transparency is projected in the manner shown in FIG. 2. When the operator pushes the button 142 toward the wall 42 the lamp becomes extinguished, and the next frame is moved into position, with the tongue 140 assuming the holding position shown in FIG. 13 until the operator again pushes the projection 146 so as to illuminate the lamp and project the next frame. The rear portion 32a of the side wall 32 can conveniently be removed at any time in order to replace one or the other or both of the batteries and in order to remove a film strip.

As has been indicated above in connection with FIGS. 1 and 3, it is also possible to use the projector of the invention as a viewer. For this purpose the structure includes a translucent mask 180 shown most clearly in FIG. 14. This translucent mask is made of a thin plastic sheet such as a white sheet of plastic material through which a certain amount of light will travel. The mask 180 is formed at its right side edge, as viewed in FIG. 14, with a forwardly extending rib 182 which directly engages the front surface of the film guide wall 76. The mask 180 is of course confined between the film guide walls 76 and the interior transverse casing wall 84. This wall 84 is formed between its ends with a substantially U-shaped notch 184 which extends around the optical axis 92 and through which light can have free access to the opening 90 of the film-guide wall 76. The edge of the mask 180 which is nearest to the wall portion 32a is guided by the rearwardly extending rib 88 of the film-guide wall 76. When the projector is held in the attitude shown in FIGS. 2, 4, and 5, the mask 180 rests at its lower edge, as viewed in FIG. 14, on the lower boss 82 which is situated adjacent the wall 44. At this time an opening 186 which is formed in the mask 180 is in alignment with the opening 90, and the optical axis 92 passes through the center of the opening 186. It will be seen from FIG. 7 that when the parts are in the position shown in FIG. 5 the opening 186 is in alignment with the opening 90 of the film-guide wall 76.

However, when the operator inverts the projector so that it has the attitude shown in FIGS. 1 and 3, the upper boss 82 of FIG. 14 will become the lower boss and the mask 180 will assume the position shown in FIGS. 10–12. Thus with the parts in the position of FIGS. 10–12 the opening 186 will be situated at an elevation lower than the opening 90, and the light will travel through a portion of the mask 180 before reaching the opening 90. In this way the light is diffused while traveling through the mask 180, and the operator can look directly into the objective means 60 in order to see in the interior of the device an image of a transparency. In this way diffused light is transmitted through the transparency when the device of the invention is used as a viewer, and at the same time the image is seen in an upright position because the device is inverted. Of course, when the objective projects an image onto the surface 22 as shown in FIG. 2, the image is inverted with respect to the position of the transparency on the opposite side of the objective, so that the inverting of the device to view the image in the interior thereof will also serve to provide a right-side-up image. Of course, the right-and-left reversal will be immaterial.

It is apparent, therefore, that with the structure of the invention a simple inexpensive device is provided capable of operating reliably to produce either images on a surface when used as a projector or interior images when used as a viewer. The strip 26 has trailing and leading ends which are blank and transparent, so that the length of the strip 26 is not critical and these ends can overlap each other, the operator advancing the strip until the first transparency is seen. The positions of the perforations of the film strip and the location of the film-advancing tooth 154 are such that when the tongue 140 is in the position shown in FIG. 13 a frame is properly positioned along the optical axis to be viewed or projected.

What is claimed is:

1. In a hand-held projector for projecting onto a given surface a series of images derived from a series of transparencies carried by a film strip, comprising hollow casing means having a pair of opposed side walls and an endless peripheral wall extending between and interconnecting said side walls and defining therewith a hollow interior of said casing means, said peripheral wall having opposed front and rear portions and opposed longitudinal portions extending between interconnecting said front and rear portions, said front portion of said peripheral wall having opposed ends and carrying substantially midway between said opposed ends an objective means having an optical axis extending substantially midway between said longitudinal portions of said peripheral wall for projecting onto said surface an image of a transparency situated in said casing means behind said objective means along said optical axis thereof, said casing means carrying in its interior a film-guide wall extending substantially perpendicularly to said side walls between the latter as well as substantially perpendicularly to said longitudinal portions of said peripheral wall, said film-guide wall having a front surface directed toward said front portion of said peripheral wall and adapted to engage and guide a film strip, and said casing means having to the rear of said film-guide wall and extending along said opposed longitudinal portions of said peripheral wall and said rear wall in the interior of said casing means a film-guide means for guiding a film strip along said film-guide wall and along said longitudinal wall portions and rear portion of said peripheral wall in the interior of said casing means, said film-guide wall being formed with an opening through which said optical axis extends, and said casing means carrying in its interior behind said film-guide wall a light source situated along said optical axis in alignment with said opening of said film-guide wall and on opposite sides of said light source a pair of batteries each extending between said film guide wall and said rear portion of said peripheral wall, one of said longitudinal wall portions of said peripheral wall being formed with a slot through which film is introduced to move along said film-guide wall and along said film guide means, one of said longitudinal portions of said peripheral wall being formed with an opening, and a manually operable film-advancing means extending through the latter opening into the interior of said casing means and being accessible at the exterior or said casing means at the region of the latter opening, said film-advancing means being situated between said film-guide wall and said objective means and cooperating with said film-guide wall for guiding the film strip, spring means situated in said casing means for urging said film-advancing means to an outer position, one of said side walls being formed with an opening and said film-advancing means having a springy pawl portion engaging an edge of the latter opening of said one side wall for maintaining said film-advancing means in an inner rest position in opposition to the force of said spring means, said film-advancing means having a film-advancing tooth for extending into a perforation of the film strip for advancing the latter during manual movement of said film-advancing means from said outer to said inner position thereof, said film-guiding wall carrying a tooth engating a perforation of the film strip to prevent the latter from moving with said film-advancing means when the latter is urged to its outer position by said spring means, and conductor means carried by said casing means in the interior thereof and electrically connected with the batteries and the light-source means for electrically connecting the batteries and light-source means into a circuit, said conductor means having portions forming a switch means for closing said circuit, said switch means having a normally closed position for energizing the light source means from the batteries, and said film-advancing means having a projection cooperating with said switch means for opening the latter and opening the circuit for deenergizing the light source means when the springy pawl of said film-advancing means engages said edge of said opening of said one side wall to maintain said film-advancing means at said inner position thereof in opposition to said spring means, whereby upon manual movement of said pawl of said film-advancing means away from said edge of said opening of said one side wall, said spring means displaces said film-advancing means to said outer position thereof whereupon said switch means closes to energize said light-source means for providing light traveling along the optical axis through said opening in said film guide means, said film-advancing means also being formed with an opening, and the latter opening being aligned with said opening of said film-guide means and situated along said optical axis only when said film-advancing means is in said outer position thereof, so that release of said film-advancing means to be moved by said spring means to said outer position thereof will result in projection of an image from a transparency aligned with the aligned openings of said film-guide means and said film-advancing means, while manual movement of said film-advancing means back to said inner position thereof will advance the next transparency into a position to be projected while a wall portion of said film-advancing means will cover said opening of said film-guide means to prevent the next transparency from having its image projected until the film-advancing means is returned by the spring means to said outer position thereof.

2. The combination of claim 1 and wherein said springy pawl of said film-advancing means is in the form of a portion integral with said film-advancing means and projecting therefrom through said opening of said one side wall to be accessible to the operator for depression to release said film-advancing means to said spring means.

3. The combination of claim 1 and wherein said front portion of said peripheral wall is formed with a non-circular opening while said objective means has a non-circular portion extending through the latter opening and having a cross-sectional configuration matching the configuration of said non-circular opening, said objective means having a threaded portion in the interior of said casing means and a nut threaded onto said threaded portion of said objective means, said opposed side walls being respectively formed with slots through which opposed peripheral portions of said nut extends to be accessible to the operator for turning movement so as to adjust the position of said objective means along said optical axis for focussing an image.

4. The combination of claim 1 and wherein one said side walls has a portion to the rear of said film-guide wall removably connected with the remainder of said casing means for giving access to the interior thereof for replacing a battery or a light-source means.

5. The combination of claim 1 and wherein a masking wall is situated at the side of said film-guide wall opposite from said film-advancing means, said film-guide wall carrying a pair of bosses between which said masking wall is located, said bosses being situated from each other by a distance greater than the length of said masking wall so that the latter is capable of falling freely between said bosses depending upon the orientation of said casing means, said masking wall having an opening eligned with said opening of said film-guide wall when resting on one of said bosses so that the light from said light-source means will travel through the opening of said masking wall as well as the opening of said film-guide wall and the opening of said film-advancing means when the latter is in its outer position, to project an image through said objective means onto a given surface, and said masking wall being made of a translucent material through which light from said light-source means can pass to a reduced extent as compared to travel of light through the opening of said masking wall, whereby when said casing means is orientated in a reverse position with said masking wall engaging the other bosses, the opening of said film-guide wall will be covered by the masking wall while the latter will still permit light to travel to a reduced extent through said opening of said film-guide wall, whereby with the latter orientation of the casing means an image of a transparency may be viewed by looking into the interior of the casing means through said objective means.

* * * * *